(12) United States Patent
Dachiku

(10) Patent No.: US 8,913,883 B2
(45) Date of Patent: Dec. 16, 2014

(54) MULTIFORMAT VIDEO PLAYBACK DEVICE AND CONTROL METHOD THEREOF

(71) Applicant: Kabushiki Kaisha Toshiba, Tokyo (JP)

(72) Inventor: Kenshi Dachiku, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 137 days.

(21) Appl. No.: 13/753,200

(22) Filed: Jan. 29, 2013

(65) Prior Publication Data

US 2013/0287372 A1 Oct. 31, 2013

(30) Foreign Application Priority Data

Apr. 27, 2012 (JP) .................................. 2012-102582

(51) Int. Cl.
*H04N 5/93* (2006.01)
*H04N 9/79* (2006.01)

(52) U.S. Cl.
CPC .................................... *H04N 9/7925* (2013.01)
USPC ........... 386/353; 348/441; 348/445; 348/446; 348/448

(58) Field of Classification Search
CPC ............................. H04N 9/7925; H04N 7/012
See application file for complete search history.

(56) References Cited

U.S. PATENT DOCUMENTS

| | | | | |
|---|---|---|---|---|
| 5,801,777 A | * | 9/1998 | Lyu .......................... | 375/240.15 |
| 6,144,412 A | * | 11/2000 | Hirano et al. ................. | 348/441 |
| 8,456,571 B1 | * | 6/2013 | Taylor et al. .................. | 348/445 |
| 2011/0249194 A1 | * | 10/2011 | Horikoshi ..................... | 348/730 |

FOREIGN PATENT DOCUMENTS

JP 2009-071526 4/2009

* cited by examiner

*Primary Examiner* — Thai Tran
*Assistant Examiner* — Stephen Smith
(74) *Attorney, Agent, or Firm* — Knobbe, Martens, Olson & Bear LLP

(57) ABSTRACT

According to one embodiment, a controller of a multiformat video playback device creates control information including a conversion instruction intended for an input processor, size specification intended for a scaler, and format specification intended for an output processor, and supplies the created control information to the input processor. A first delay section delays the control information supplied to the input processor by one frame, and supplies the delayed control information to the scaler. A second delay section delays the control information supplied to the scaler by one frame, and supplies the resultant control information to the output processor.

3 Claims, 6 Drawing Sheets

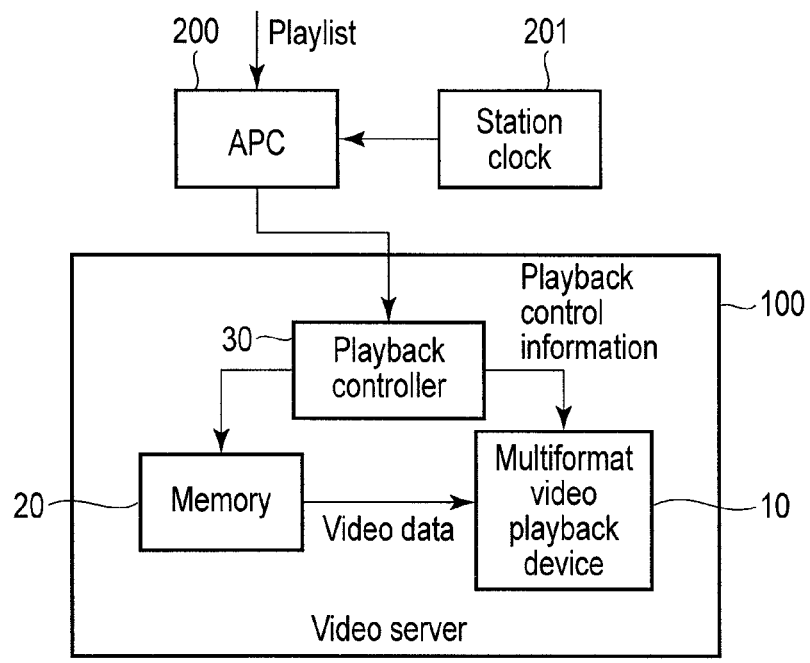
F I G. 2
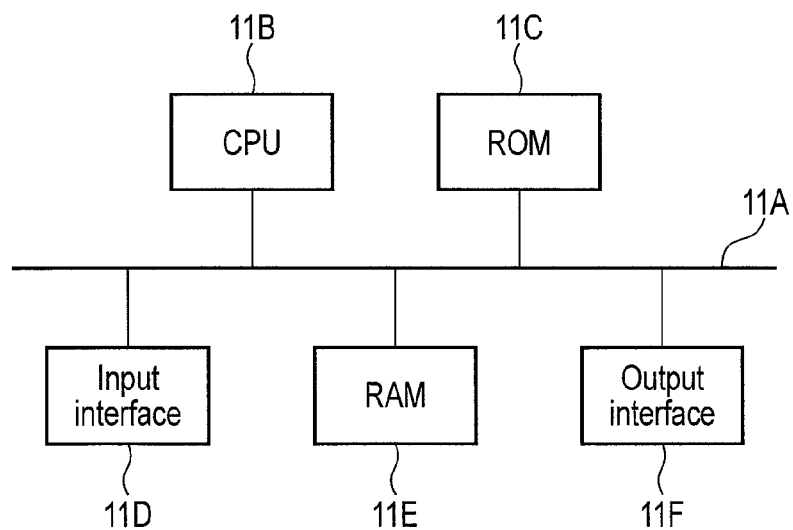
F I G. 3

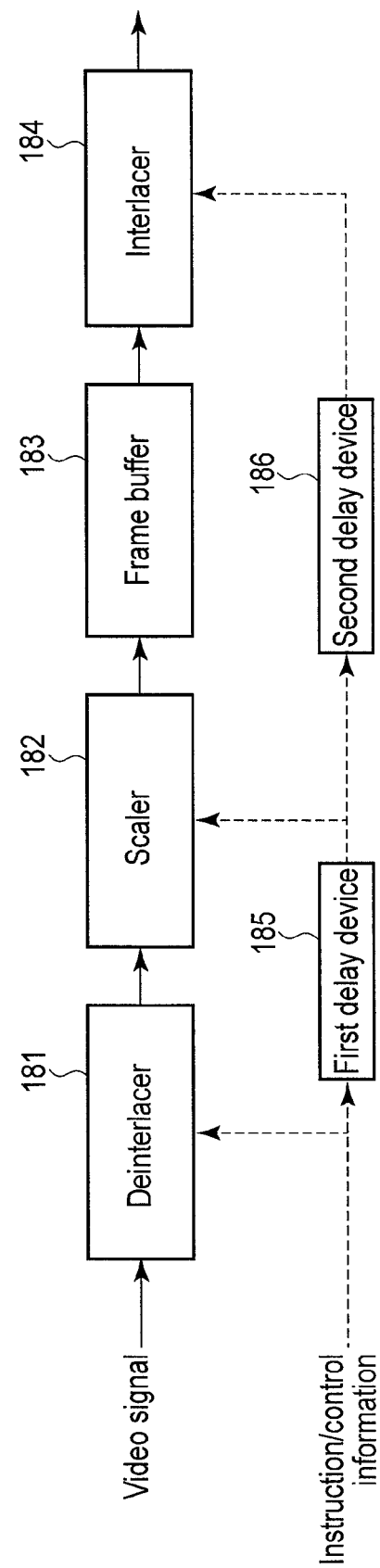
F I G. 4

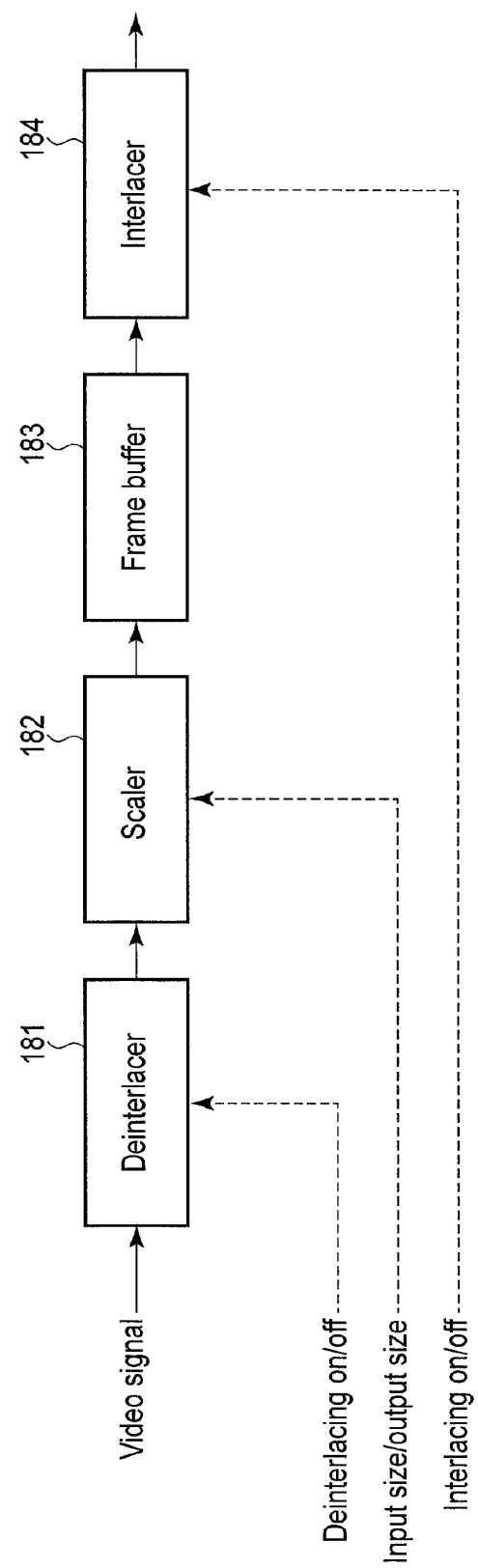
F I G. 6

MULTIFORMAT VIDEO PLAYBACK DEVICE AND CONTROL METHOD THEREOF

CROSS-REFERENCE TO RELATED APPLICATIONS

This application is based upon and claims the benefit of priority from Japanese Patent Application No. 2012-102582, filed Apr. 27, 2012, the entire contents of which are incorporated herein by reference.

FIELD

Embodiments described herein relate generally to a multiformat video playback device configured to decode a video signal based on a plurality of formats different from each other in definition, and converts the decoded video signal into a video signal based on a format of arbitrary definition to output the converted video signal, and control method thereof.

BACKGROUND

As formats of a video footage handled in broadcast, there are an interlaced video signal of standard definition (SD), interlaced video signal (1080i) of high definition (HD), and progressive video signal (720p). When a video footage based on different formats is reproduced as a video signal of a specified format, a multiformat video playback device is used.

This multiformat video playback device decodes an input video footage, converts the decoded video footage into a progressive signal when the video footage is an interlaced signal, up-converts or down-converts the resultant into a video signal of a specified format and, when the specified format is an interlaced format, reads the video signal in the interlaced format, thereby reproducing a video signal in the specified format.

It should be noted that, in the multiformat video playback device, an up/down converter provided with both the up-conversion function and down-conversion function is used. The up/down converter can immediately cope with both up-conversion and down-conversion by switching corresponding to the input/output format. However, the up/down converter immediately copes with the switching instruction, and hence, irregularities occur in the video when conversion is switched from up-conversion to down-conversion or from down-conversion to up-conversion in some cases.

BRIEF DESCRIPTION OF THE DRAWINGS

FIG. 2 is a block diagram showing the functional configurations of a video server in which the multiformat video playback device of FIG. 1 is employed, and broadcast station provided with the video server.

FIG. 3 is a block diagram showing the functional configuration of a controller of the multiformat video playback device of FIG. 1.

FIG. 4 is a block diagram showing the functional configuration of a format converter of the multiformat video playback device of FIG. 1.

FIG. 6 is a block diagram showing the functional configuration of a format converter of the multiformat video playback device of FIG. 5.

DETAILED DESCRIPTION

In general, according to one embodiment, there is provided a multiformat video playback device compatible with a video signal based on a plurality of formats, and configured to convert an input video signal into a video signal of a specified size and a specified format, and output the converted video signal comprising:

an input processor configured to capture the input video signals corresponding to one frame, and convert the captured video signals into progressive video signals according to an instruction of control information;

a scaler configured to resize a video signal output from the input processor to a video signal of a size specified by the control information;

a frame buffer configured to sequentially store therein the resized video signals corresponding to one frame;

an output processor configured to read the video signals stored in the frame buffer according to a format specified by the control information, and output the read video signals;

a controller configured to create control information including a conversion instruction intended for the input processor, size specification intended for the scaler, and format specification intended for the output processor, and supply the created control information to the input processor;

a first delay section configured to delay the control information supplied to the input processor by one frame, and supply the delayed control information to the scaler; and a second delay section configured to delay the control information supplied to the scaler by one frame, and supply the resultant control information to the output processor.

Hereinafter, embodiments will be described with reference to the drawings.

(First Embodiment)

Figure 1:
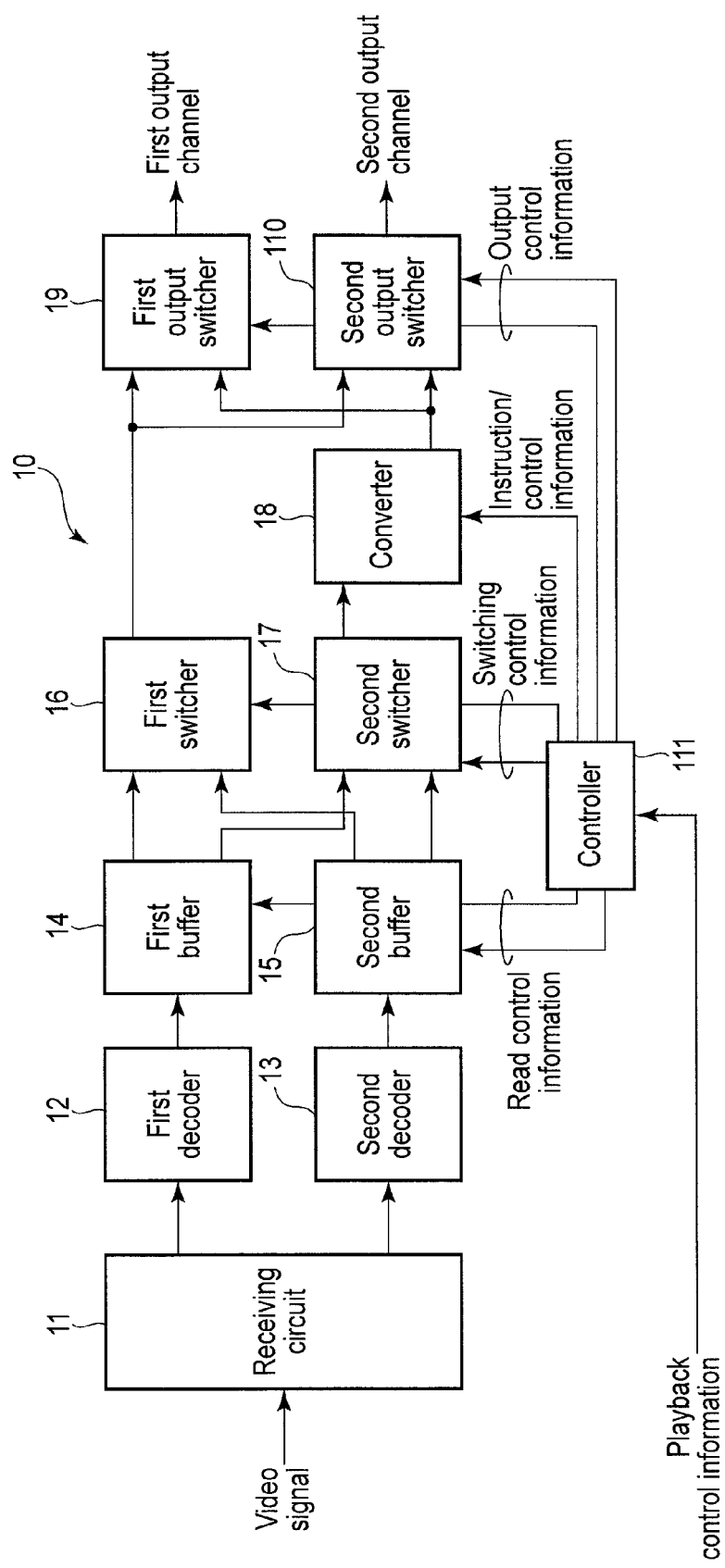
FIG. 1 is a block diagram showing the functional configuration of a multiformat video playback device according to a first embodiment.

FIG. 1 is a block diagram showing the functional configuration of a multiformat video playback device (hereinafter referred to as the multiformat video playback device) 10 according to a first embodiment. FIG. 2 is a block diagram showing the functional configurations of a video server 100 in which the multiformat video playback device 10 is employed, and broadcast station provided with the video server 100. FIG. 3 is a block diagram showing the functional configuration of a controller of the multiformat video playback device of FIG. 1.

First, in a broadcast station, a video server 100, automatic program transmission controller (APC) 200, and station clock 201 are provided.

The APC 200 refers to a playlist prepared on the basis of a broadcast schedule and, when the time indicated by the station clock 201 reaches a time described in the playlist, gives an instruction to reproduce a program footage to be reproduced at the time to the video server 100.

The video server 100 includes a video data storage memory 20 and playback controller 30 together with the multiformat video playback device 10.

In the video data storage memory 20, video data used as a program footage scheduled to be broadcast is stored. Here, the formats of the video data to be stored in the memory 20 include a mode of HD video data formed by encoding (compression coding) a high-definition (HD) video signal, and mode of SD video data formed by encoding a standard-definition (SD) video signal. Further, the HD video data includes a mode of video data (interlaced) conforming to 1080i, and mode of video data (progressive) conforming to 720p. Hereinafter, data conforming to 1080i is referred to as HD video data 1, and data conforming to 720p is referred to as HD video data 2.

The playback controller 30 is configured to control the memory 20, and playback of the multiformat video playback device 10 according to instruction information from the APC 200, and causes specified video data to be read from the memory 20, notifies playback control information indicating the definition of the video data read from the memory 20, and an output channel to be used to output a video signal to the multiformat video playback device 10, causes the multiformat video playback device 10 to decode video data items sequentially read from the memory 20, and convert the decoded video data item into a specified format to output the converted video data item.

The multiformat video playback device 10 is provided with a receiving circuit 11, first decoder 12, second decoder 13, first buffer 14, second buffer 15, first switcher 16, second switcher 17, format converter 18, first output switcher 19, second output switcher 110, and controller 111.

The receiving circuit 11 subjects video data supplied from the memory 20 through a network to reception processing and, thereafter outputs the video data selectively to a first or second processing system according to the definition of the video data. More specifically, when video data items of the same definition are consecutively supplied, the video data items are output to the same processing system and, when video data items of different definition are consecutively supplied, the video data items of the different definition items are output to different processing systems.

The first and second decoders 12 and 13 have the same configuration, and each of them decodes video data supplied from the receiving circuit 11 by a system corresponding to an encoding system thereof. For example, when HD video data 1 is supplied, by decoding the supplied HD video data 1 by a system corresponding to the encoding system of the HD video data 1, an HD video signal 1 is obtained. Further, When HD video data 2 is supplied, by decoding the HD video data 2 by a system corresponding to the encoding system of the HD video data 2, an HD video signal 2 is obtained. Furthermore, when SD video data is supplied, by decoding the SD video data by a system corresponding to the encoding system of the SD video data, an SD video signal is obtained. In this way, a video signal decoded by the first decoder 12 is supplied to the first buffer 14, and a video signal decoded by the second decoder 13 is supplied to the second buffer 15.

The first buffer 14 is configured to hold the video signal supplied from the first decoder 12, and outputs the held video signal to the first or second switcher 16 or 17 according to first read control information from the controller 111. Likewise, the second buffer 15 is configured to hold the video signal from the second decoder 13, and outputs the held video signal to the first or second switcher 16 or 17 according to second read control information from the controller 111.

The first switcher 16 selects one of the video signal from the first buffer 14, and video signal from the second buffer 15, and outputs the selected video signal to one of the first and second output switchers 19 and 110 according to first switch control information from the controller 111. Likewise, the second switcher 17 selects one of the video signal from the first buffer 14, and video signal from the second buffer 15, and outputs the selected video signal to the format converter 18 according to second switch control information from the controller 111.

When the video signal is supplied from the second switcher, the format converter 18 subjects the supplied video signal to format conversion according to instruction/control information from the controller 111. That is, the format converter 18 carries out up-conversion of converting an SD video signal into an HD video signal 1 or an HD video signal 2, down-conversion of converting an HD video signal 1 or an HD video signal 2 into an SD video signal, or cross-conversion of mutually converting an HD video signal 1 and HD video signal 2 to each other. The format converter 18 outputs the video signal which has been subjected to the conversion processing to the first and second output switchers 19 and 110.

An output end of the first output switcher 19 is connected to a first output channel configured to output an HD video signal 1 or 2. The first output switcher 19 receives a video signal sent from the first switcher 16, and video signal sent from the converter 18, and switches output of the received video signal at timing based on first output control information from the controller 111. Thereby, HD video signals 1 or HD video signals 2 are seamlessly output to the first output channel.

The second output switcher 110 is connected to a second output channel configured to output an SD video signal. The second output switcher 110 receives a video signal sent from the first switcher 16, and video signal sent from the converter 18, and switches output of the received video signal at timing based on second output control information from the controller 111. Thereby, SD video signals are seamlessly output to the second output channel.

The controller 111 is constituted by connecting a central processing unit (CPU) 11B such as a microprocessor or the like, read-only memory (ROM) 11C for program storage, input interface 11D, random access memory (RAM) 11E for work, and output interface 11F to a bus 11A as shown in FIG. 3. That is, in the controller 111, the CPU 11B executes a program stored in the ROM 11C, whereby playback control information sent from the playback controller 30 is input through the input interface 11D, creation of instruction/control information for read intended for the first and second buffers 14 and 15, instruction/control information for switching intended for the first and second switchers 16 and 17, conversion control information intended for the format converter 18, and output control information intended for the first output switcher 19 and second output switcher 110 is carried out by using the work area of the RAM 11E, and these information items are transmitted from the output interface 11F to first and second buffer 14, 15, first and second switcher 16, 17, the format converter 18 and first and second output switcher 19, 110.

An operation of the format converter 18 constituting a characteristic feature of this embodiment in the multiformat video playback device 10 configured as described above will be described below in detail.

FIG. 4 is a block diagram showing the functional configuration of the format converter 18. The format converter 18 is provided with a deinterlacer 181, scaler 182, frame buffer 183, interlacer 184, first delay device 185, and second delay device 186.

The deinterlacer 181 captures input video signals in units of frames according to control information indicating an instruction to turn deinterlacing on or off sent from the controller 111 and, when the captured video signal is an interlaced signal, converts the video signal into a progressive video signal and, when the captured video signal is a progressive video signal, brings the conversion processing into an off-state, and outputs the video signal after a delay of one frame. In accordance with control information from the controller 111 indicating an input size and output size, the scaler 182 subjects a video signal output from the deinterlacer 181 to expansion processing or reduction processing in order to obtain video of a specified format. The frame buffer 183 sequentially accumulates video signals output from the scaler 182 to an amount corresponding to one frame. In accordance with control information indicating instructions to turn interlacing on or off from the controller 111, when the specified format is an interlaced format, the interlacer 184 reads video signals from the frame buffer 183 in the interlacing order and, when the specified format is a progressive format, the interlacer 184 brings the interlacer into an off-state, and reads video signals from the frame buffer 183 in the progressive order.

Here, although the controller 111 sends instruction/control information to the deinterlacer 181, scaler 182, and interlacer 184 at the stage where the input video signals are input, it is necessary to take the processing time of each processor into consideration. That is, the deinterlacer 181 requires a processing time corresponding to one frame, and a delay corresponding to one frame occurs in the frame buffer 183, and hence the read start of the interlacer 184 is delayed from the output timing of the scaler 182 by a time corresponding to one frame. Accordingly, hitherto, when video signals having different formats are input, the input timing of the video signals, and the timing of issuing of instruction/control information to each processor are not synchronized with each other, and irregularities occur in the video at the time of conversion processing in some cases.

Thus, in this embodiment, the instruction/control information output from the controller 111 is input to the deinterlacer 181 as it is, is input to the scaler 182 by being delayed by one frame by the first delay device 185, and is input to the interlacer 184 by being further delayed by one frame by the second delay device 186. Thereby, the control timing at each processor, and timing at each of the input video signals are synchronized with each other and, even when the input video signals are switched to video signals of a different format, it is possible to eliminate the irregularities occurring in the output video signal.

(Second Embodiment)

It should be noted that, although in the configuration of first embodiment, the case where adjustment of the control timing is realized by using the delay devices 185 and 186 has been described, it is also possible to adjust the control timing by software processing based on program execution.

Figure 5:
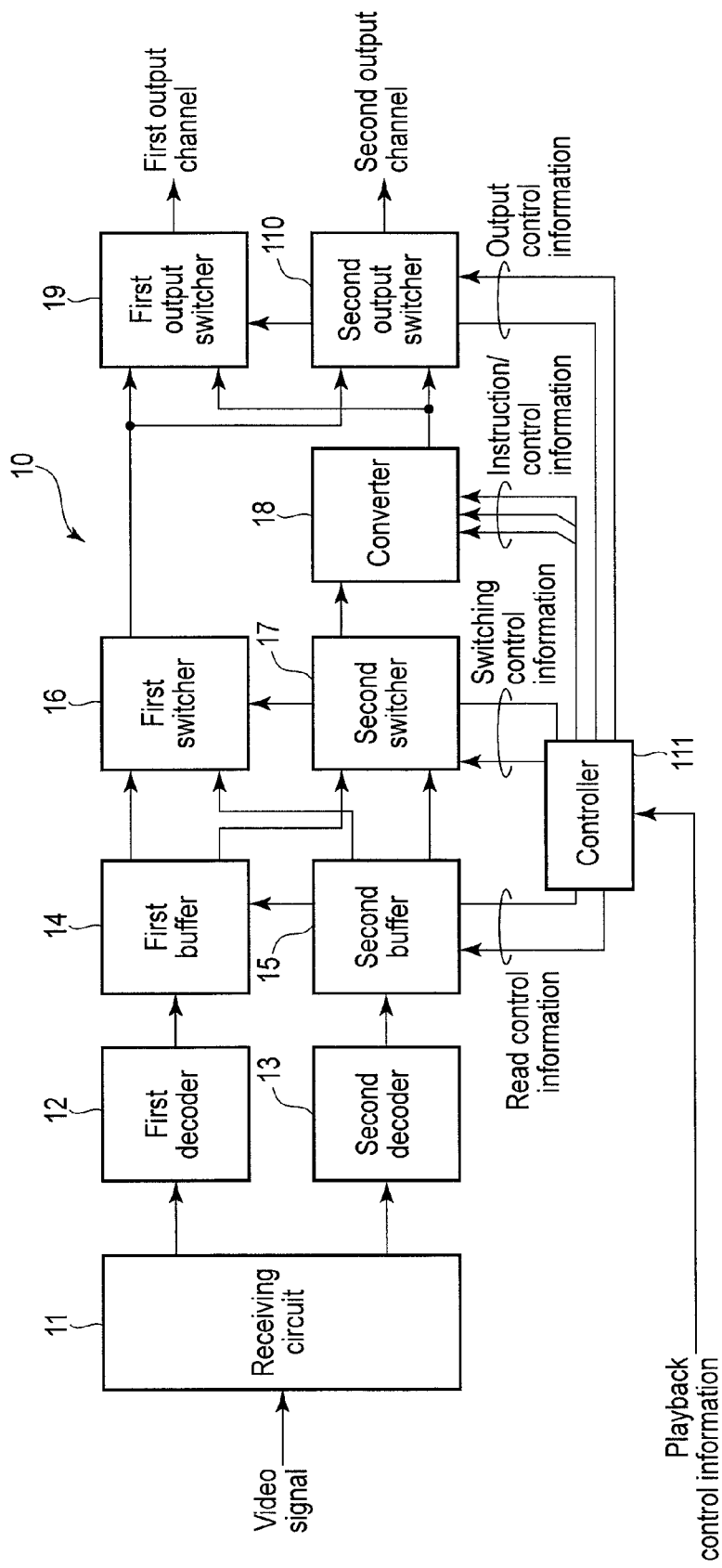
FIG. 5 is a block diagram showing the functional configuration of a multiformat video playback device according to a second embodiment.
Figure 7:
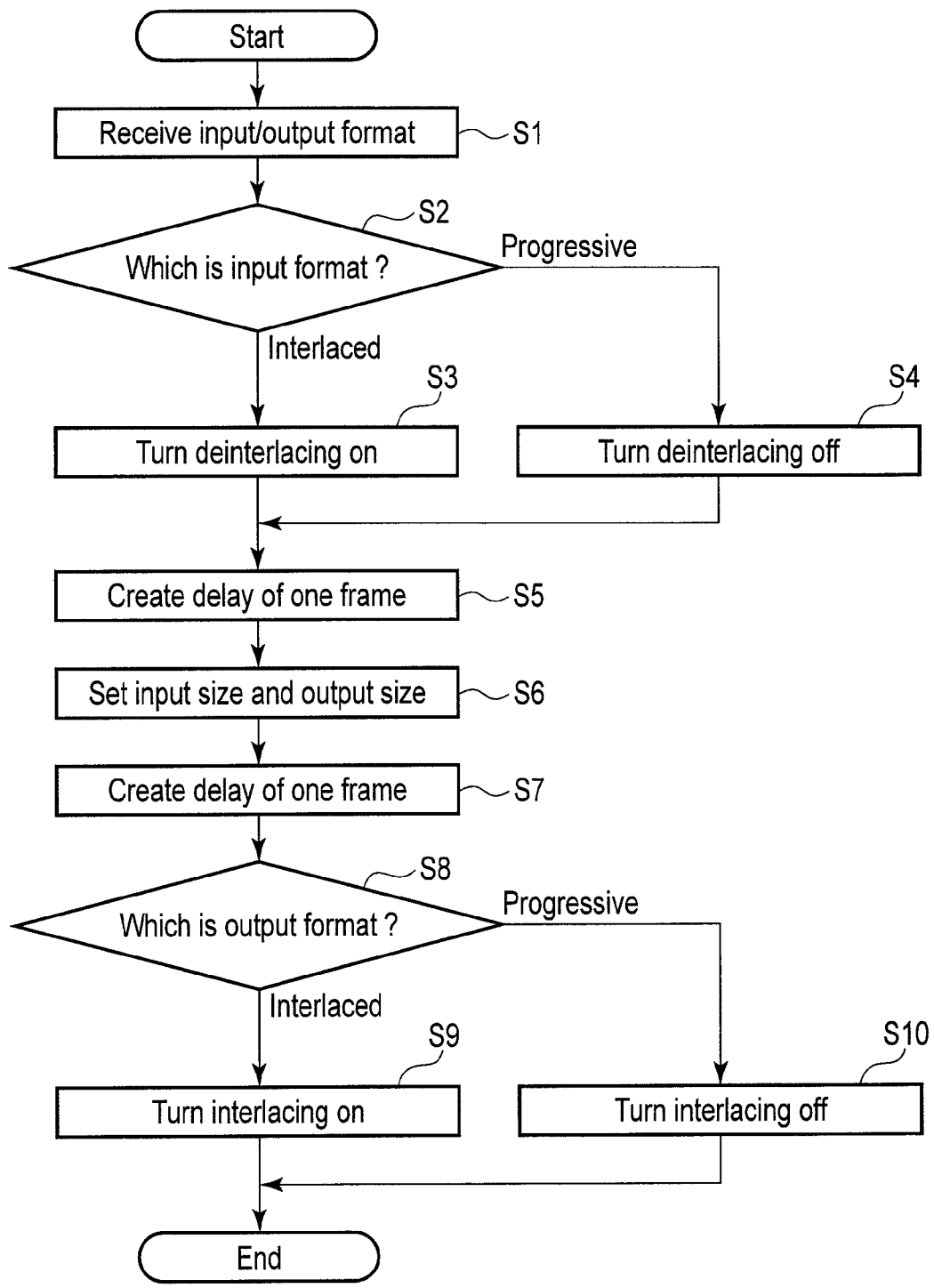
FIG. 7 is a flowchart showing a flow of processing in a controller of the format converter of FIG. 5.

FIG. 5 is a block diagram showing the functional configuration of a multiformat video playback device 10 according to a second embodiment, FIG. 6 is a block diagram showing the functional configuration of a format converter of FIG. 5, and FIG. 7 is a flowchart showing a flow of processing of a case where software adjustment is carried out for the format converter of FIG. 5. It should be noted that in FIG. 5 and FIG. 6, the same parts as those in FIG. 1 and FIG. 4 are denoted by the same reference symbols, and a duplicated description is omitted. Further, the video server described in the first embodiment is also the same in the second embodiment, and hence a description thereof is omitted.

The characteristic feature of the multiformat video playback device of this embodiment is that in FIG. 5 and FIG. 6, a controller 111 directly sends instruction/control information to a deinterlacer 181, scaler 182, and interlacer 184 of a format converter 18.

First, upon receipt of playback control information sent from a playback controller 30 (step S1), the controller 111 of the multiformat video playback device 10 determines whether an input format specified by the playback control information is an interlaced format or a progressive format (step S2). Here, when it is determined that the input format is an interlaced format, instruction/control information indicating an instruction to turn the deinterlacer on is output (step S3) and, when it is determined that the input format is an progressive format, instruction/control information indicating an instruction to turn the deinterlacer off is output (step S4). Here, accumulation corresponding to one frame is required for the deinterlacer, and hence a delay (standby) corresponding to one frame is created (step S5).

After creating the delay, an input size and output size specified by the playback control information are read, and are output to the scaler 182 as size instruction/control information (step S6). Subsequently, a delay (standby) is created for one frame period during which a video signal output from the scaler 182 is written to the frame buffer 183 (step S7) and, thereafter it is determined whether an output format specified by the playback control information is an interlaced format or a progressive format (step S8). Here, when it is determined that the output format is an interlaced format, instruction/control information indicating an instruction to turn on read processing based on interlacing is output to the interlacer 184 (step S9) and, when it is determined that the output format is a progressive format, instruction/control information indicating an instruction to turn interlaced read processing off is output to the interlacer 184 (step S10).

As described above, according to the embodiment based on the above configuration, it becomes possible to adjust the control timing by software. As a result, even when the multiformat video playback device has a single-chip configuration like a field-programmable gate array (FPGA), it is possible to omit the delay devices, and hence it is possible to contribute to space saving.

It should be noted that, in the above embodiment, although the input video signal is once decoded, and is then stored in the buffer, the input video signal may first be stored in the buffer, and may then be subjected to decoding processing. Further, although the two output systems are provided in the above embodiment, the case of only one output system is probable. Further, the multiformat video playback device of this embodiment is not limited to application to the video server, but is also applicable to a system if the system is a system in which mutually converted output of video signals of a plurality of formats is required.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A multiformat video playback device compatible with a video signal based on a plurality of types of formats, and configured to convert an input video signal into a video signal of a specified size and a specified format, and output the converted video signal comprising:

an input processor configured to capture the input video signals corresponding to one frame, and convert the captured video signals into progressive video signals according to an instruction of control information;

a scaler configured to resize a video signal output from the input processor to a video signal of a size specified by the control information;

a frame buffer configured to sequentially store therein the resized video signals corresponding to one frame;

an output processor configured to read the video signals stored in the frame buffer according to a format specified by the control information, and output the read video signals;

a controller configured to create control information including a conversion instruction intended for the input processor, size specification intended for the scaler, and format specification intended for the output processor, and supply the created control information to the input processor;

a first delay section configured to delay the control information supplied to the input processor by one frame, and supply the delayed control information to the scaler; and a second delay section configured to delay the control information supplied to the scaler by one frame, and supply the resultant control information to the output processor.

2. A multiformat video playback device configured to input thereto a video signal based on a plurality of types of formats, convert the input video signal into a video signal of a specified size and a specified format, and output the converted video signal comprising:

an input processor configured to capture the input video signals corresponding to one frame, and convert the captured video signals into progressive video signals according to an instruction of control information;

a scaler configured to resize a video signal output from the input processor to a video signal of a size specified by the control information;

a frame buffer configured to sequentially store therein the resized video signals corresponding to one frame;

an output processor configured to read the video signals stored in the frame buffer according to a format specified by the control information, and output the read video signals; and a controller configured to give a conversion instruction to the input processor, provide size specification to the scaler, and provide format specification to the output processor, wherein the controller creates control information for the conversion instruction intended for the input processor, and supplies the created control information to the input processor, stands by a time corresponding to one frame, creates control information for size specification intended for the scaler, and supplies the created control information to the scaler, stands by a time corresponding to one frame, and creates control information for format specification intended for the output processor, and supplies the created control information to the output processor.

3. A control method to be used for a multiformat video playback device compatible with a video signal based on a plurality of types of formats, and configured to convert an input video signal into a video signal of a specified size and a specified format, and output the converted video signal, the method comprising:

when the multiformat video playback device comprises an input processor configured to capture the input video signals corresponding to one frame, and convert the captured video signals into progressive video signals according to an instruction of control information;

a scaler configured to resize a video signal output from the input processor to a video signal of a size specified by the control information;

a frame buffer configured to sequentially store therein the resized video signals corresponding to one frame; and an output processor configured to read the video signals stored in the frame buffer according to a format specified by the control information, and output the read video signals, creating control information for the conversion instruction intended for the input processor, and supplying the created control information to the input processor;

standing by a time corresponding to one frame;

creating control information for size specification intended for the scaler, and supplying the created control information to the scaler;

standing by a time corresponding to one frame; and creating control information for format specification intended for the output processor, and supplying the created control information to the output processor.

* * * * *